Water Solubility Curve of Boric Acid Anhydride in the Presence of Free Sodium Oxide at Constant Temperature of 30° Centigrade INVENTORS
Thomas M. Cramer
George A. Connell
By
ATTORNEY

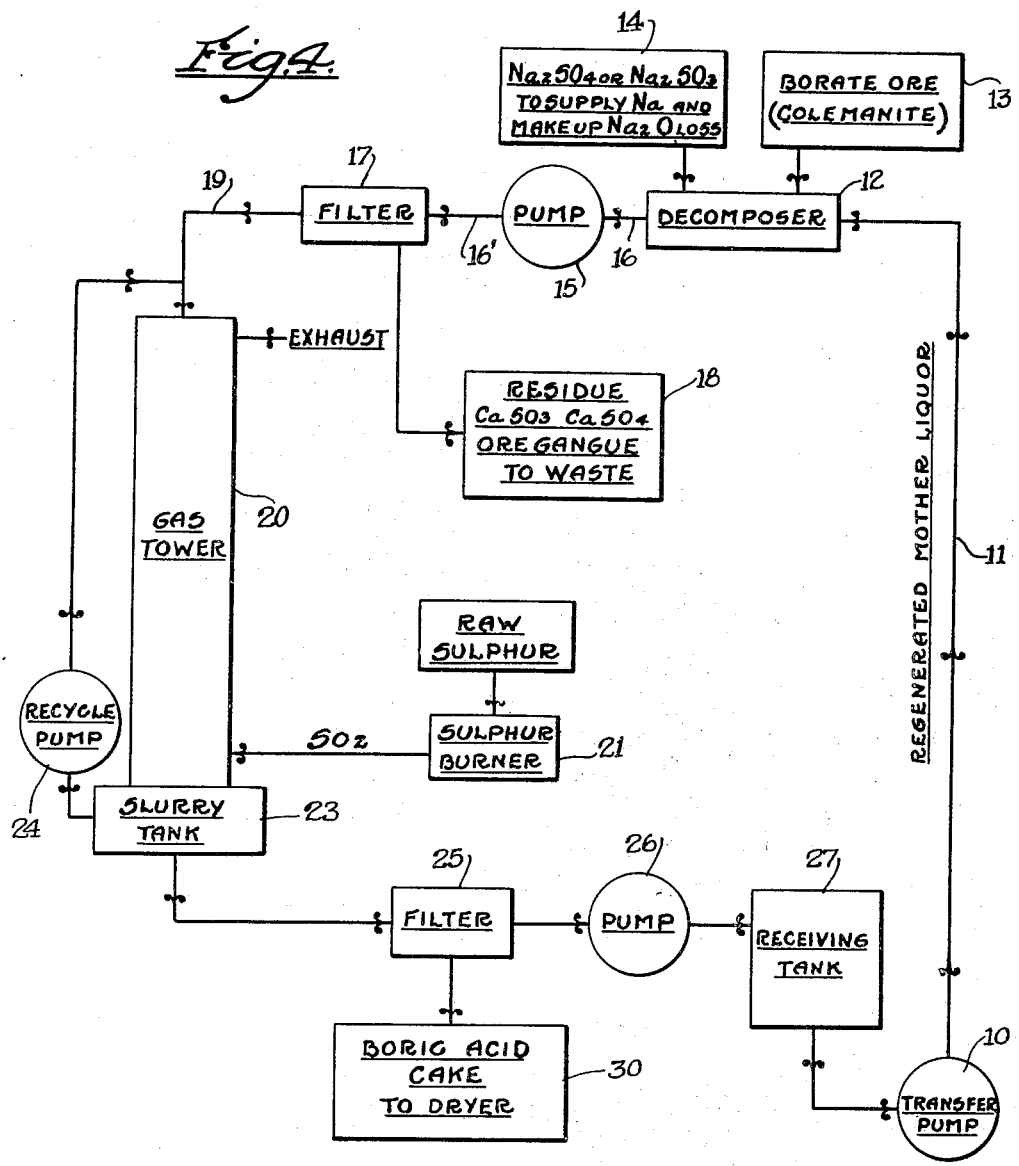

Patented Sept. 19, 1933

1,927,013

UNITED STATES PATENT OFFICE 1,927,013

PROCESS FOR THE PRODUCTION OF BORIC ANHYDRIDE AS BORIC ACID FROM COLEMANITE OR THE LIKE

Thomas M. Cramer, Long Beach, and George A. Connell, Wilmington, Calif., assignors to Pacific Coast Borax Company, a corporation of Nevada Application August 12, 1926. Serial No. 128,747

4 Claims. (Cl. 23—149)

As implied by the above title, this invention relates to processes or methods involving a decomposition of so-called "insoluble" borates, such as colemanite to yield boric acid, and it relates more particularly to processes utilizing, in a novel manner, the action of certain sulphur compounds, without the aid of artificial heat.

Processes using sulphur dioxide, and/or sulphurous acid and/or sulphuric acid in the production of boric acid or boric acid anhydride are well known; and it is also well-known that sulphur dioxide may be produced by burning sulphur or pyrites in a surplus of air—as indicated by the reaction (a) $S + O_2 = SO_2$ sulphurous acid resulting from a dissolving of the sulphur dioxide in water:

(b) $SO_2 + H_2O = H_2SO_3$

Colemanite, in its natural state contains water of crystallization but processes of concentration heretofore in commercial operation have frequently reduced colemanite to a practically anhydrous state. For the purposes of this description, the chemical composition of colemanite, as a typical raw material for use in our novel process, will accordingly be expressed with reference to the anhydrous condition,—although it is to be understood that the operations described may be applied to borates in either a hydrous or an anhydrous condition.

Anhydrous colemanite = $Ca_2B_6O_{11}$ (or $2CaO.3B_2O_3$)

but various calcium borates or mixed borates may be worked with facility by the process hereinafter described, and, although we may direct a separate application to the utilization of borates containing both alkali-earth metals and alkali metals, it should be understood that our present application is not limited to the working of colemanite.

For comparison, we may mention that a common method of producing boric acid from colemanite involves a reduction of the colemanite to a comparatively fine state of subdivision (as by grinding or by calcination) followed by a treatment with water and sulphuric acid at an elevated temperature—gangue and calcium sulphate being filtered off while the mixture is hot.

(c) $Ca_2B_6O_{11} + 2H_2SO_4 + 7H_2O = 2CaSO_4 + 6H_3BO_3$.

The filtrate is then permitted to cool to such a temperature that boric acid may be obtained by crystallization; and the boric acid is recovered from the cooled solution in a known manner.

Somewhat similarly, boric acid may be produced from colemanite, or the like, by suspending the raw material in a suitable amount of hot water or mother liquor and adding sufficient sulphur dioxide to react with the colemanite to liberate the boric acid—filtration or other removal of calcium sulphite and gangue materials being followed by a cooling, and the crystals obtained by such cooling being recovered in a known manner.

(d) $Ca_2B_6O_{11} + 2SO_2 + 9H_2O = 2CaSO_3 + 6H_3BO_3$.

It should be clearly understood that the foregoing reactions, descriptive of the methods heretofore known and herein cited for purposes of comparison, are carried out under heat; and, that the boric acid is produced by the subsequent cooling of a solution, to effect a crystallization of desired products; and the described processes, as now in commercial use, have the following notable drawbacks as compared with the process which we have discovered and herein claim:

(1) Colemanite is almost always associated with limestone and with other carbonates which also react with the liberating or decomposing reagent—sulphuric or sulphurous acid; and this incidental reaction implies a waste of reagents, and a corresponding increase in the amounts required to produce a given quantity of boric acid.

(2) Alternate heating and cooling of solutions has been required—which is an important item of expense and has practically prevented the chemical treatment of the raw material at or near those points—often in desert regions where the colemanite, or its equivalent is mined.

We propose a process for the production of boric acid which, in contrast with the known processes above outlined, does not require the use of heat, and which is notably more economical in its use of decomposing reagents. In the execution of our process, while there may be considerable variations in the temperatures of solutions (such variations being due, for example, to weather conditions and/or to what we may term an "accidental" addition of heat, incidental to the burning of sulphur) for all purposes of our process the temperature of solutions may remain constant; and herein lies one important economy in our unique process.

As to the chemical theory of our process, we make use of already ascertained variations in the solubility of the borate ion or boric acid anhydride ($B_2O_3$) in the presence of varying amounts of sodium oxide (Na₂O)—it being understood that the latter is to be present in a state enabling it to combine with the borate ion, or boric acid anhydride (B₂O₃).

Fig. 4 is a flow sheet showing the steps of the process.

From the mentioned chart, it will be seen that we can get a comparatively high concentration of boric acid anhydride, employing a decomposing solution containing boric acid anhydride and a suitable ratio of sodium oxide, sodium sulphite, sodium bisulphite, and/or sodium sulphate (any or all of them) by making use of the following decomposing reactions.

Figure 1:
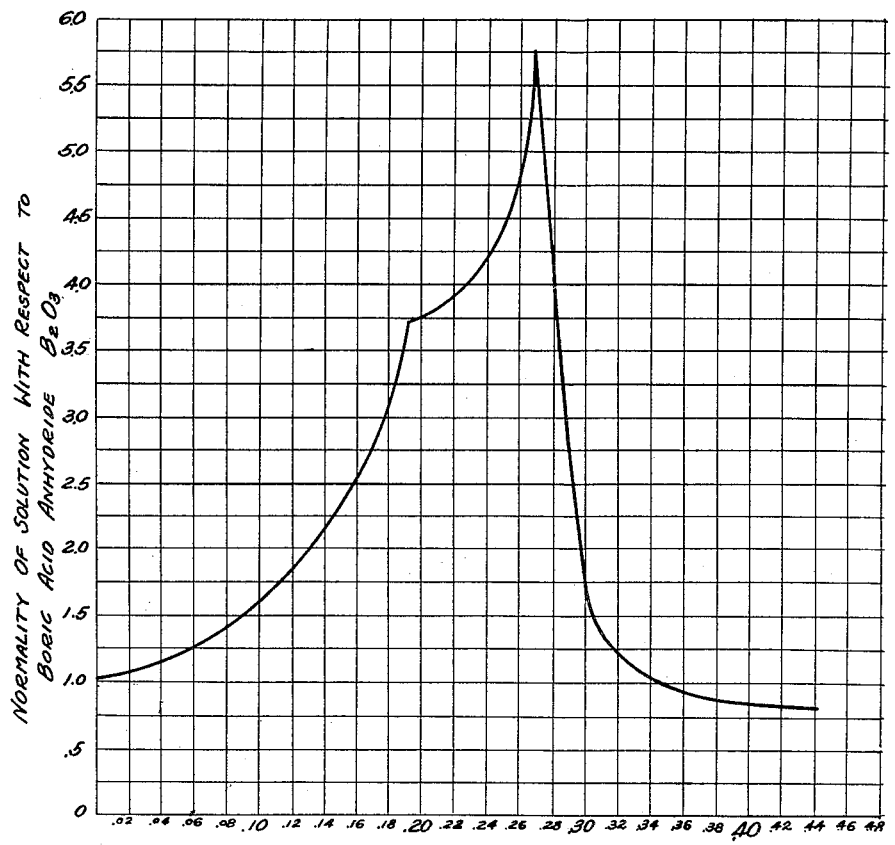
Fig. 1 is a chart indicating approximately the solubility of boric acid anhydride at one temperature (86° Fahrenheit) varying ratios of sodium oxide relatively to boric acid anhydride being present.

(e) $Ca_2B_6O_{11} + 2Na_2SO_3 =$
$2CaSO_3 + (Na_2O + 3B_2O_3)$ (f) $Ca_2B_6O_{11} + 2NaHSO_3 =$
$2CaSO_3 + (Na_2O + 3B_2O_3) + H_2O$ (g) $Ca_2B_6O_{11} + 2Na_2SO_4 =$
$2CaSO_4 + (Na_2O + 3B_2O_3)$ and our new process may be said to consist essentially in an alternation of the reactions (h) and (i) (constituting Figs. 2 and 3) consistently with the indications of Fig. 1,—any usual or preferred apparatus (as mere wooden vats, etc.) being employed.

We emphasize at this point that the reaction of Equation (g) (that between colemanite and sodium sulphate) takes place only under certain conditions; and ascertainment of these conditions constitutes a portion of the discovery herein disclosed,—the maintenance of said conditions being a feature to which claims are hereinafter directed.

Since the analytical data pertinent to our process may be subject to various interpretations, several compositions and combinations in solution (containing sodium oxide, boric acid anhydride, sulphur dioxide, and/or sulphuric acid anhydride) are herein made the subject of special definition.

"Fixed sodium oxide": By this term we herein mean sufficient sodium oxide to combine with all of the sulphuric acid anhydride present to form sodium sulphate. This fixed sodium oxide cannot be detected by titration with standard hydrochloric acid.

"Free sodium oxide": A dilute solution of sodium acid sulphite or bisulphite is approximately neutral to methyl red, as is also a dilute solution of boric acid anhydride. Any sodium oxide determinable by titration of a "process liquor" with a standard hydrochloric acid solution, using methyl red as an indicator, is herein called "free sodium oxide", and is considered as in combination with, or as free to combine with boric acid anhydride,—as in the "filtrate" of Equation (h), Fig. 2.

"Total alkaline sodium oxide": This is herein considered to be that sodium oxide which is present as "free sodium oxide" plus that which is present as sodium acid sulphite, and is determined by adding an excess of standard hydrochloric acid, heating to expel sulphur dioxide, and titrating the excess of acid with sodium hydroxide, using methyl red as an indicator (Na₂O.2SO₂) herein representing the acid sulphite or bisulphite.

In a solution containing only "free Na₂O", the "total alkaline Na₂O" is the same as the free Na₂O, whereas in a solution containing both free Na₂O and NaHSO₃ or Na₂O.2SO₂ the value for the total alkaline sodium oxide is equal to the quantity of free Na₂O, present as alkali, plus the Na₂O, present as bisulphite, the latter being substantially neutral to methyl red unless means are taken to expel sulphur dioxide from solution.

For convenience in illustrating the invention and to avoid confusion, we have illustrated the reactions as taking place in the anhydrous state. Actually, when in aqueous solution, the Na₂O is probably present as $$Na_2O.2SO_2 + H_2O = 2NaHSO_3.$$

To illustrate the foregoing,—expressing in terms of normality the composition of a "process liquor", obtained by sulphiting, we might have (although the boric acid content may vary widely, as between .5ON and 1.7ON):

|  | Normal |
|---|---|
| Boric acid anhydride | 1.05 |
| Free sodium oxide | .00 |
| Total alkaline sodium oxide | .35 |
| Sulphur dioxide | .70 |
| Fixed sodium oxide | .60 |

Figure 2:
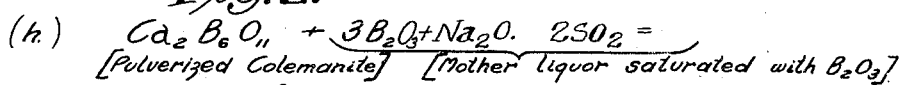
Fig. 2 is an equation illustrating one step in our novel process, with explanatory legends.
Figure 2:
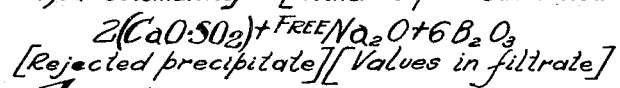

The above values may have been determined by analyzing a mother liquor of the type indicated in Fig. 2, and reducing the values obtained to terms of normality. It will be observed from Fig. 2 that all the Na₂O is present as sodium acid sulphite and can be determined only by adding an excess of HCl and titrating back with alkali and so comes within the definition of total alkaline Na₂O. Inasmuch as the "fixed Na₂O", which is present in solution as sulphate, takes no part in the reaction as shown, we have not indicated this material in Equation h.

It will be useful herein to define and use a ratio designated as "R", letting this "R" equal the "free sodium oxide" divided by the boric acid anhydride, both expressed in terms of normality. R is strictly a ratio of molecules or fractions thereof and not a ratio of molecular weights. Thus, in the case of the above solution $$"R" = \frac{.00}{1.05} = .00$$

Further illustrating the present use of the quantity "R", another characteristic solution, obtained in the process herein described, results from a treatment of a new batch of colemanite with a "process liquor" of the character referred to in the above tabulation. Such treatment might theoretically produce a mixture substantially as follows: (See Equation (h) Fig. 2).

|  | Normal |
|---|---|
| Boric acid anhydride | 2.10 |
| Free sodium oxide | .35 |
| Total alkaline sodium oxide | .35 |
| Sulphur dioxide | .00 |
| Fixed sodium oxide | .60 |

These values may be determined in the same manner as those in the foregoing table by analyzing a solution obtained by treating $Ca_2B_6O_{11}$ with the mother liquor. It will be observed that the value for the "free Na₂O" and the total "alkaline Na₂O" are the same, indicating that there is no sodium acid sulphite present. The theoretical value of "R" of the enriched solution is the ratio of "free Na₂O" (expressed in terms of normality) to the B₂O₃ (expressed in terms of normality). In other words, where the reaction of Equation $h$ has gone to completion, we can express "R" as the ratio of the number of molecules of Na₂O to the number of molecules of B₂O₃ present in the equation; in other words, $$"R" = \frac{1}{6} = .167$$

or (from the table)

$$"R" = \frac{.35}{2.10} = .167$$

It should be understood, however, that the ratio of free Na₂O to B₂O₃ in the enriched solution referred to in Fig. 2 as a filtrate may vary within wide limits.

The two solutions to which the above tabulations refer—although somewhat idealized (since unnamed ingredients such as chlorides, silicates, ferrous and ferric salts are likely to be present) illustrate the principles involved in our mentioned terminology; but in actual practice it may be commonly found most satisfactory to carry an excess of sodium bisulphite or sodium sulphate—above that theoretically required—in order to assure a more complete decomposition of the borate ore.

As indicated above, our process utilizes alternate generation and destruction of "free sodium oxide", as defined, or alternately increasing and decreasing the alkalinity in a solution containing boric acid anhydride—the generation of the "free sodium oxide" being accompanied by the addition of boric acid anhydride from the Ca₂B₆O₁₁, the destruction of the "free sodium oxide" or the neutralization or decrease in alkalinity being effective to produce a precipitation of the added boric acid anhydride, in the form of boric acid H₃BO₃ and a sufficient quantity of B₂O₃ being regularly retained in the mother liquor, practically to saturate the same.

The generation of "free sodium oxide" creates a condition which permits of the presence of (and a holding in solution of) anhydrous boric acid, in amounts exceeding that which the solutions or liquors would, at any given operating temperature, be capable of holding in solution, were the "free sodium oxide" not present. It therefore follows that the "mother liquor" although saturated with boric acid anhydride, if properly handled, can be enriched with boric acid anhydride without a change in temperature. Enrichment, in processes heretofore in vogue, has been accomplished by the addition of heat, the temperature of the solution being raised in order to raise the saturation point with reference to boric acid anhydride. Our solution, on the other hand, is enriched without the aid of heat; and it can be filtered clear of any gangue material and/or suspended or precipitated calcium that may have been associated with the boric acid anhydride in the colemanite or other calcium borate. The clarified solution may then be "gassed" by sulphur dioxide in any suitable absorption apparatus and in any known or preferred manner, the boric acid being precipitated. The cycle of operations followed in practicing the process is illustrated in the flow sheet in Fig. 4 and the theory of the chemical changes involved may be illustrated by the chemical reactions $(h)$ and $(i)$ constituting Figs. 2 and 3.

By the reactions referred to, it will be seen that a filtrate is produced, containing "free sodium oxide" and boric acid anhydride in substantially the ratios R=.167; and reference to the solubility chart shows that at R=.167 (assuming temperature equals 86° F., or thereabouts—a frequent desert temperature) the solubility of anhydrous boric acid is over 2.5 normal—whereas the solubility of boric acid anhydride in the absence of the "free sodium oxide" is about 1.0 normal. Reaction $(h)$ of Fig. 2 as pointed out in the specific example given above where the normality of boric acid anhydride in the mother liquor is 1.05 produces about a 2-normal (2.1) solution,—which, of course, is only four-fifths saturated with respect to the boric acid anhydride,—and is therefore suitable for filtration and manipulation without danger of crystallization and consequent loss of values. After "gassing" with sulphur dioxide (by reaction $(i)$ of Fig. 3) the "free sodium oxide" disappears; and consequently the solubility of the boric acid anhydride is lowered. By the same reaction whereby the boric acid anhydride of the colemanite is precipitated, a mother liquor is regenerated; and this mother liquor may have substantially the same composition with which the cycle was started. Thus the described steps will be seen to be capable of indefinite repetition, with successive batches of colemanite—the sulphur dioxide being the only reacting material, in addition thereto, which, in theory, requires to be replenished.

There are certain side reactions that tend to complicate the ideal cycle above described; and the manner in which we commercially apply our discoveries accordingly involves further reactions. In the burning of sulphur, a certain percentage of the material is naturally oxidized to sulphuric anhydride (SO₃); and, again, in the handling of liquors containing sulphur and oxygen in the form of sulphites, bisulphites and sulphurous acid, an oxidation takes place upon contact with air during the pumping, filtration and gassing operations. This oxidation tends to add sulphates to the solutions used, at the expense of sulphites. For each quantity of sulphuric anhydride generated, an equivalent quantity of "free sodium oxide" or of "total alkaline sodium oxide," is converted to "fixed sodium oxide," and our process may accordingly include steps to induce or deter oxidations of the general character referred to.

One division of our discovery, as will appear from the above, deals with the regeneration of sodium oxide from the "fixed" to the "free" state. Under ordinary conditions, sodium sulphate in solution reacts only to a limited extent upon colemanite to form calcium sulphate and to liberate "free sodium oxide,"—the reaction being, as above indicated:

(g) 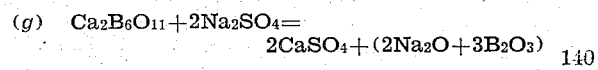
$$Ca_2B_6O_{11} + 2Na_2SO_4 = 2CaSO_4 + (2Na_2O + 3B_2O_3)$$

So far as known, the foregoing reaction never has been utilized commercially to liberate boric acid anhydride from colemanite,—the usual explanation being that calcium sulphate, freshly precipitated, appears more soluble than the calcium borate; and, such being the case, the reaction does not proceed even approximately to completion. We have discovered, however, that if a certain amount of "free boric acid" (represented in an equation below by 8B₂O₃) is present in solution with the sodium sulphate, then the reaction does proceed in a manner making the same commercially applicable. This may be illustrated by one of several forms of reaction, as for example, (j) $Ca_2B_6O_{11} + 2Na_2SO_4 + 8B_2O_3 =$
$\qquad 2CaSO_4 + (2Na_2O + 11B_2O_3.)$ This reaction (j) may be preceded by oxidation referred to, such as, (k) $\quad 2SO_2 + O_2 = 2SO_3$; or
(l) $\quad 2H_2SO_3 + O_2 = 2H_2SO_4$; or
(m) $\quad 2Na_2SO_3 + O_2 = 2Na_2SO_4$;

and it may be followed by reactions such as:

(n) $\quad (2Na_2O + 11B_2O_3) + 4SO_2 =$
$\qquad 11B_2O_3 + 2(Na_2O.2SO_2)$
(for use as mother liquor) $+ 3B_2O_3$ As to the explanation of reactions such as that indicated by equation (j), we have discovered that the calcium borate, in the presence of "free" boric acid anhydride, as set forth in the reaction and under the indicated conditions, is more soluble than the calcium sulphate; and therefore the decomposition of colemanite proceeds practically to completion.

The essential condition of the liquor required to get this exceedingly practical decomposition appears to be that the solution shall at all times be more acid than is a solution which contains boric acid anhydride and "free sodium oxide" in the ratio $R = .26$. As will appear from the curve in Fig. 1 this value gives a small "factor of safety" before the apex is reached in the solubility curve.

Ascertainment of the conditions necessary for the generation of "free sodium oxide" from sodium sulphate in the general manner set forth in (j) constitutes an important feature of our discovery of a commercially practicable "cold" process for boric acid production,—the use of the last mentioned reaction (n) and the presence of sodium sulphate in our process being of very material aid in maintaining the proper ratio of "free sodium oxide" to boric acid anhydride in the filtrate referred to in reaction (h), Fig. 2; and, to afford further guidance, we may mention that the minimum solubility of boric acid anhydride in reaction solutions appears to be reached when the sodium oxide is all either in the "fixed sodium oxide" state or is combined with sulphurous acid, to make sodium bisulphite—in other words, when the solution is neutral or is acid to methyl red, there being no "free sodium oxide" present.

The flow sheet in Fig. 4 illustrates a specific example of a preferred cycle of operations in the practice of our process. Referring to the flow sheet, we show the regenerated mother liquor as being delivered from a transfer pump 10 through a pipe line 11 to a decomposer 12, which may be in the form of a suitable vat, where it reacts with colemanite, received from a suitable hopper indicated at 13, according to Equation h in Fig. 2.

Additional $Na_2SO_4$ or $Na_2SO_3$ may be added to the decomposer from time to time from a suitable source indicated at 14 to make up $Na_2O$ loss in the cycle.

Figure 3:
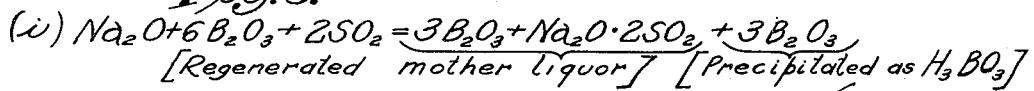
Fig. 3 is an equation pertinent to a subsequent (gassing) step,—the steps illustrated by Figs. 2 and 3 being suitable for indefinite repetition—optionally in conjunction with other steps hereinafter described.

The slurry in the decomposer, which consists of gangue, precipitated $CaSO_3$ and $CaSO_4$ and a solution of (free $Na_2O + 6B_2O_3$) is pumped, by means of pump 15 through pipe lines 16 and 16' and a filter 17. The residue is discarded as indicated at 18 and the filtrate passes through line 19 to a gas tower 20. As the filtrate passes downwardly through the tower 20 it is subjected to the action of the gaseous products of combustion from a sulphur burner 21. Thus the boric acid is liberated and the mother liquor is regenerated according to the reaction in Equation i (Fig. 3). To improve the efficiency of this step, we may recirculate the solution through the tower from a slurry tank 23 at the bottom thereof. A recycle pump 24 is shown as being provided for this purpose.

The slurry from the slurry tank 23 then passes through filter 25 which separates the boric acid from the regenerated mother liquor. The regenerated mother liquor is delivered by means of pump 26 to a receiving or storage tank 27 which has its outlet connected with the transfer pump 10, and the boric acid cake is delivered to a dryer or suitable storage vat indicated at 30.

In conclusion, we emphasize that, sulphur being capable of cheap transport (in case it is not immediately at hand), and no fuel being required in the operation of our described process, the process has the important merit that it may be executed in the immediate vicinity of a mine,—the precipitated product being then suitable for storage or for transport, and the cost of such transport being materially smaller than that involved in the handling of the original colemanite or other mineral, as mined; and also that, by reason of the low temperatures of operation, and the avoidance of strong acids, the cost of the requisite handling and treating equipment may be greatly reduced, as compared with costs incurred in processes heretofore known,—it being practicable to substitute wooden or iron vats, pipes and containers for corresponding equipment, heretofore made from lead, or other expensive acid-resisting materials.

Although we have herein emphasized the steps whose theory is indicated by the respective Equations (h) and (i) (constituting Fig. 2 and Fig. 3) of the present application, it should be understood not only that various features of our invention might be independently used, but also that numerous modifications and/or adaptations of our invention, might be devised, by those skilled in the chemical arts to which this case relates, without the slightest departure from the spirit and scope of our invention, as the same is indicated above and in the following claims—some of said claims being directed to the main features thereof and still others to various combinations of features which cooperate to produce the novel and advantageous results above set forth.

We claim as our invention:

1. A process of the general character described comprising the steps of producing a mother liquor containing $B_2O_3$, $Na_2O$, and $SO_2$ in which boric acid anhydride is comparatively soluble; treating a calcium borate with said mother liquor to precipitate calcium sulphite ($CaO.SO_2$); removing the calcium sulphite ($CaO.SO_2$); and treating the solution with $SO_2$ gas to regenerate the mother liquor and precipitate boric acid.

2. In the production of boric acid, a process which comprises: reacting upon a calcium borate with a mother liquor saturated with $B_2O_3$ and containing ($3B_2O_3 + Na_2O.2SO_2$) to form a filtrate ($Na_2O + 6B_2O_3$) containing free $Na_2O$ substantially as indicated in the following equation:

$Ca_2B_6O_{11} + (3B_2O_3 + Na_2O.2SO_2) =$
$\qquad 2(CaO.SO_2 + (\text{free } Na_2O + 6B_2O_3))$ then separating the calcium sulphite ($CaO.SO_2$) and passing $SO_2$ gas through said filtrate to regenerate said mother liquor and precipitate boric acid $(3B_2O_3)$ according to the following equation—

$$Na_2O + 6B_2O_3 + 2SO_2 = 3B_2O_3 + Na_2O.2SO_2 + (3B_2O_3)$$

3. A process of preparing boric acid from an insoluble calcium borate which comprises: treating an insoluble calcium borate with a process liquor containing $B_2O_3$ and sodium sulphite, thereby forming a calcium sulphite precipitate and a filtrate containing free $Na_2O$ and $B_2O_3$, filtering off the calcium sulphite, passing $SO_2$ gas through the filtrate, thereby regenerating the process liquor and precipitating boric acid.

4. A method of producing boric acid from a mineral containing a calcium salt thereof which comprises: treating such salt with a process solution containing sodium sulphate and boric acid anhydride at atmospheric temperature; separating precipitated calcium sulphate from the solution; and precipitating boric acid from the solution by passing $SO_2$ gas therethrough.

THOMAS M. CRAMER.
GEORGE A. CONNELL.